(12) United States Patent
La Forest et al.

(10) Patent No.: US 7,063,870 B2
(45) Date of Patent: Jun. 20, 2006

(54) MANUFACTURE OF FUNCTIONALLY GRADED CARBON-CARBON COMPOSITES

(75) Inventors: Mark L. La Forest, Granger, IN (US); Charles A. Parker, Granger, IN (US); Frank Dillon, Granger, IN (US); Thomas H. Siegmund, West Lafayette, IN (US); Raymond J. Cipra, West Lafayette, IN (US); Alan E. Fatz, Centerville, OH (US); Peter F. Braunisch, Rochester Hill, MI (US); Tobey Cordell, Dayton, OH (US)

(73) Assignee: Honeywell International Inc., Morristown, NJ (US)

( * ) Notice: Subject to any disclaimer, the term of this patent is extended or adjusted under 35 U.S.C. 154(b) by 28 days.

(21) Appl. No.: 10/852,933

(22) Filed: May 25, 2004

(65) Prior Publication Data

US 2005/0266220 A1    Dec. 1, 2005

(51) Int. Cl.
*C23C 16/26* (2006.01)

(52) U.S. Cl. ............... 427/249.1; 427/249.3; 427/372.2; 427/255.12; 264/454; 264/478; 264/494; 264/645

(58) Field of Classification Search ............ 428/317.9, 428/245, 304.4, 224, 311.51, 316.6, 252, 428/311.11; 427/249.1, 290, 249.3, 255.12, 427/372.2; 264/454, 463, 645, 478, 494
See application file for complete search history.

(56) References Cited

U.S. PATENT DOCUMENTS

| | | |
|---|---|---|
| 3,794,509 A | 2/1974 | Trauger et al. |
| 4,457,967 A | 7/1984 | Chareire et al. |
| 5,147,588 A | 9/1992 | Okura et al. |
| 5,454,990 A | 10/1995 | Chareire et al. |
| 5,643,663 A * | 7/1997 | Bommier et al. ........ 428/317.9 |
| 6,083,436 A | 7/2000 | Thompson et al. |
| 6,093,482 A | 7/2000 | Park et al. |

(Continued)

OTHER PUBLICATIONS

Fatz et al., "Manufacture of Functionally Gradient Carbon—Carbon Composites", Proceedings of the 17th Technical Conference of the American Society of Composites, Oct. 21-23, 2002, Purdue University, West Lafayette, Indiana.

(Continued)

*Primary Examiner*—Merrick Dixon
(74) *Attorney, Agent, or Firm*—Birch, Stewart, Kolasch & Birch, LLP.

(57) ABSTRACT

Annular brake disc preform (15), wherein 40 to 80 layers of reinforcement fibers of at least two different lengths (11, 19) ranging from 10–60 mm are distributed in a planar gradient throughout the body of the preform, with the reinforcement fibers located near the exterior planes of the disc being predominately shorter fibers (11) and with the reinforcement fibers located in the central planes of the disc being predominately longer fibers (19). Also, process of making carbon-carbon composite preforms by: providing chopped pitch or PAN fibers (11, 19) of at least two different lengths; directing a robotic spraying apparatus to spray the chopped fibers into an annular mold (5) in 40 to 80 concentric iterations of chopped fiber deposition to provide a matrix of fibers in the mold; depositing a curable binder into the mold to intermix the binder with the fiber matrix; compressing the fiber matrix and curable binder within the mold; curing the binder to form a preform matrix; filling the preform matrix with pitch to form a pitch matrix; and subjecting the pitch matrix to chemical vapor deposition to form a carbon-carbon composite preform (15).

13 Claims, 5 Drawing Sheets

U.S. PATENT DOCUMENTS

| | | | |
|---|---|---|---|
| 6,183,583 B1 | 2/2001 | Duval et al. | |
| 6,328,834 B1 | 12/2001 | Rebstock et al. | |
| 6,361,722 B1 | 3/2002 | Theys et al. | |
| 6,365,257 B1 * | 4/2002 | Hecht | 428/65.9 |
| 6,531,011 B1 | 3/2003 | Gross et al. | |
| 6,537,470 B1 | 3/2003 | Wood et al. | |
| 6,543,663 B1 * | 4/2003 | Davis | 227/2 |

OTHER PUBLICATIONS

Jørgensen et al., "Spherical Indentation of Composite Laminates with Controlled Gradients in Elastic Anisotropy", International Journal of Solids and Structures, vol. 35, pp. 5097-5113 (1998).

Liakus et al., "Processing-microstructure-property predictions for short fiber reinforced composite structures based on a spray deposition process", Composite Structures, vol. 61, pp. 363-374 (2003).

Siegmund et al., "A Proposed Novel Approach to Manufacturing Low Cost High Temperature Composite Materials", Transactions of the North American Manufacturing Institution of the Society of Manufacturing Engineers, vol. 30, pp. 557-564 (2002).

Suresh et al., abstract of "Fundamentals of Functionally Graded Materials—Processing and Thermomechanical Behavior of Graded Metals and Metal—Ceramic Composites", The University Press, Cambridge (1997).

Zak et al., "Mechanical properties of short—fibre layered composites: prediction and experiment", Rapid Prototyping Journal, vol. 6, pp. 107-118 (2000).

* cited by examiner

MANUFACTURE OF FUNCTIONALLY GRADED CARBON-CARBON COMPOSITES

BACKGROUND

This invention relates to the production of carbon-carbon composite materials. Such composites are used, for instance, in aircraft, automobile, and train braking systems. More specifically, this invention provides a method for the automated production of carbon-carbon composites with control over fiber type, fiber length, and fiber volume fraction, in order to permit optimization of mechanical, thermal, and wear properties of the composites.

Significant effort over the years has gone into the improvement of carbon-carbon composites. For instance, Zak et al, *Rapid Prototyping Journal*, vol. 6, pp. 107–118 (2000), discuss mechanical properties of short-fiber layered composites. Liakus et al, *Composite Structures*, vol. 61, pp. 363–374 (2003), explore the relationships between processing, microstructures, and properties for short fiber reinforced composite structures obtained by a spray deposition process. Siegmund et al, Transactions of the *North American Manufacturing Institution of the Society of Manufacturing Engineers*, vol. 20, pp. 557–564 (2002), propose a novel approach to manufacturing low cost high temperature composite materials. Wood et al, U.S. Pat. No. 6,357,470 B1, disclose the rapid densification of porous bodies (performs) with high viscosity resins or pitches using a resin transfer molding process. Fatz et al, *Proceedings of the 17th Technical Conference of the American Society of Composites*, 21–23 Oct. 2002, Purdue University, West Lafayette, Ind., described certain aspects of the manufacture of functionally gradient carbon-carbon composites. Suresh et al review relevant properties in "Fundamentals of Functionally Graded Materials", The University Press, Cambridge (1997). And Jørgensen et al, *International Journal of Solids and Structures*, vol. 35, pp. 5097–5113 (1998), discuss the use of composite laminates with controlled gradients in elastic constants to improve response to contact loading.

SUMMARY OF THE INVENTION

The present invention describes a novel process for the production of composite structures that have gradients in material properties. The process of this invention employs a composite preforming system that produces chopped fiber tows through the use of a robotic chopping and spraying system. Thereby, the present process provides control over
(1) fiber output rates such that the final composite can possess variations in its reinforcement content,
(2) fiber tow segment length,
(3) reinforcement type, that is, various combinations of types and/or sized of PAN or pitch based fibers commonly used in carbon-carbon composites, and
(4) combinations of two or three of these process parameters (1) to (3).

In accordance with the present invention, chopped fiber tow segments are deposited into a rotating mold, and a system for the deposition of a binder resin into the mold is synchronized with the fiber tow spray system. Densification of the preform is conducted through preform compaction, curing of the resin, resin transfer molding, pitch stabilization, heat treatment, and chemical vapor deposition. The new types of carbon-carbon composite materials produced by the method of the present invention are reinforced by discontinuous fibers of variable fiber length, variable reinforcement volume fraction, and variable fiber type. An important contribution of the method of this invention is the ability to control these parameters so as to enable gradients thereof across and through an individual carbon-carbon composite preform. This allows for adjustment of the material microstructure to the specific requirements of a particular application.

A process embodiment of this invention contemplates making a carbon-carbon composite preform, preferably a preform configured as a brake disc, using a robotic spraying apparatus to spray chopped fibers into an annular mold in order to provide a matrix of fibers in the mold. The chopped fibers may be pitch fibers or poly(acrylonitrile) fibers. In this invention, fibers of at least two different lengths will generally be utilized. A curable binder, e.g., a phenolic resin powder, is also deposited in the mold and intermixed with the fiber matrix. Binder deposition is preferably accomplished simultaneously with fiber deposition. Binder deposition may be accompanied by the deposition of a particulate antioxidant, e.g., silicon carbide.

The fiber matrix and curable binder are then compressed within the mold, and cured to form a preform. The porous preform is subsequently compressed under higher temperatures and pressures to stage the thermoset resin. Alternatively, it is possible to perform the compaction and resin staging in one step. After post cure and carbonization, the porous preform is infiltrated with high carbon yielding pitch resin to form a pitch matrix and increase the density of the preform. The pitch is then stabilized and charred within the preform. The preform is subsequently subjected chemical vapor deposition to maximize the density of the carbon-carbon composite part.

The fiber bed is provided by multiple concentric iterations of chopped fiber deposition in a first, bottom layer within the mold perpendicular to the axis of rotation of the mold, followed by multiple concentric iterations of chopped fiber deposition in subsequent, higher planes within the mold. In the brake disc embodiments of this invention, shorter fibers are preferably deposited in the bottom areas of the brake disc preform, longer fibers are preferably deposited in the central areas of the brake disc preform, and shorter fibers are preferably deposited in the top areas of the brake disc preform The shorter fibers will aid in reducing wear rates and are deposited close to the bottom and/or top surfaces of the composite part. Longer fibers can aid in providing strength and can be used in the core of the brake part. Intermediate length fibers, having lengths longer than those of the short fibers and shorter than those of th elong fibers, may be deposited in the areas between the central portion and the top and bottom areas of the brake disc preform. The shorter fibers may, for instance, range in length from 10–20 mm and the longer fibers may, for instance, range in length from 40–60 mm. Intermediate length fibers, having lengths ranging, for example, from 15–50 mm, may be deposited in the areas between the central areas and the top and bottom areas of the brake disc preform. Normally, the spraying step is repeated many times in order to provide the bed of fibers in said mold.

An article embodiment of this invention contemplates an annular brake disc preform, having reinforcement fibers of at least two different lengths distributed throughout the body of the preform, with the reinforcement fibers located near the exterior planes of the disc being predominately shorter fibers and with the reinforcement fibers located in the central planes of the disc being predominately the longer fibers. Multiple, e.g., 40 to 80, layers of fibers having various lengths are deposited within the brake disc preform in a planar gradient in which the fiber lengths are increased from the bottom of the disc to the middle thereof and then are decreased to the top of the disc.

This invention also provides a method of improving the balance of friction, wear, and strength properties in a carbon-carbon composite brake disc of a given weight. This method of the present invention contemplates manufacturing the carbon-carbon composite brake disc from a preform having a gradation in fiber length. The gradation contemplated is that of a planar gradient in which the fiber lengths are increased from the bottom of the disc to the middle thereof and then are decreased towards the frictional surface of the disc.

BRIEF DESCRIPTION OF THE DRAWINGS

Various objects and features of the present invention will become apparent from the detailed description hereinbelow, considered in conjunction with the accompanying drawings. It is to be understood, however, that the drawings are designed solely for purposes of illustration and not as a definition of the limits of the invention. It should be further understood that the drawings are not necessarily drawn to scale and that, unless other wise indicated, they are merely intended to conceptually illustrate the structures and procedures described herein.

DETAILED DESCRIPTION

Figure 1A:
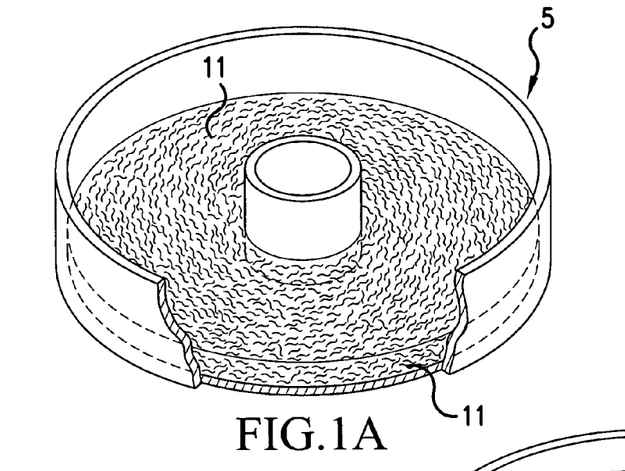
FIGS. 1A, 1B, and 1C are perspective views of a preform mold in accordance with this invention.
Figure 1B:
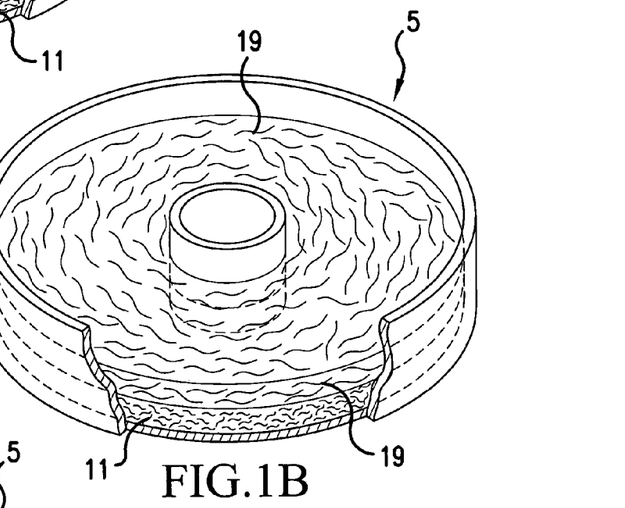
Figure 1C:
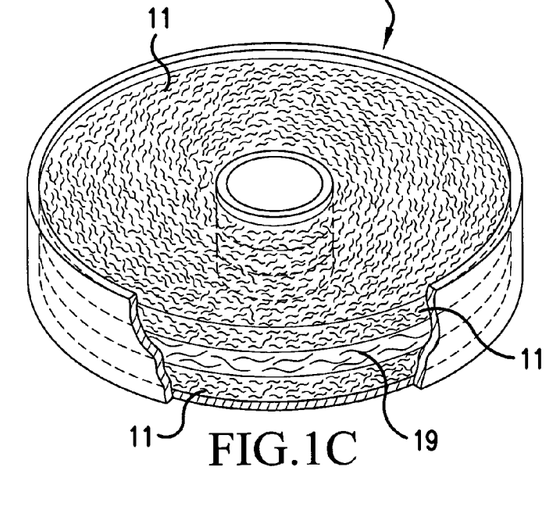

MOLD CONFIGURATION. The preforming apparatus consists of a mold in the form of two concentric steel cylinders attached to a bottom plate. The inner and outer diameters of the mold are chosen such that the final product satisfies dimensional considerations after all shrinkage an swelling processes during manufacturing are accounted for. The height of the mold is chosen such that all material deposited in the fiber deposition step can be contained. FIGS. 1A, 1B, and 1C depict a preform mold in accordance with this invention. In FIG. 1A, a first layer of fibers is shown deposited across the inside bottom of the mold cavity. FIG. 1B shows the mold at the middle of the filling process, with the reinforcement fibers filling in approximately half of the mold cavity. FIG. 1C depicts the mold at the end of the filling process. In this view, the mold cavity is effectively filled with the reinforcement fibers that have been deposited therein by repeated passes of a fiber spray nozzle, as disclosed in detail hereinbelow.

In a preferred embodiment of this invention, the cylindrical mold may be attached to a device that rotates the mold with the rotational axis being the cylinder axes oriented in the vertical direction.

Figure 2:
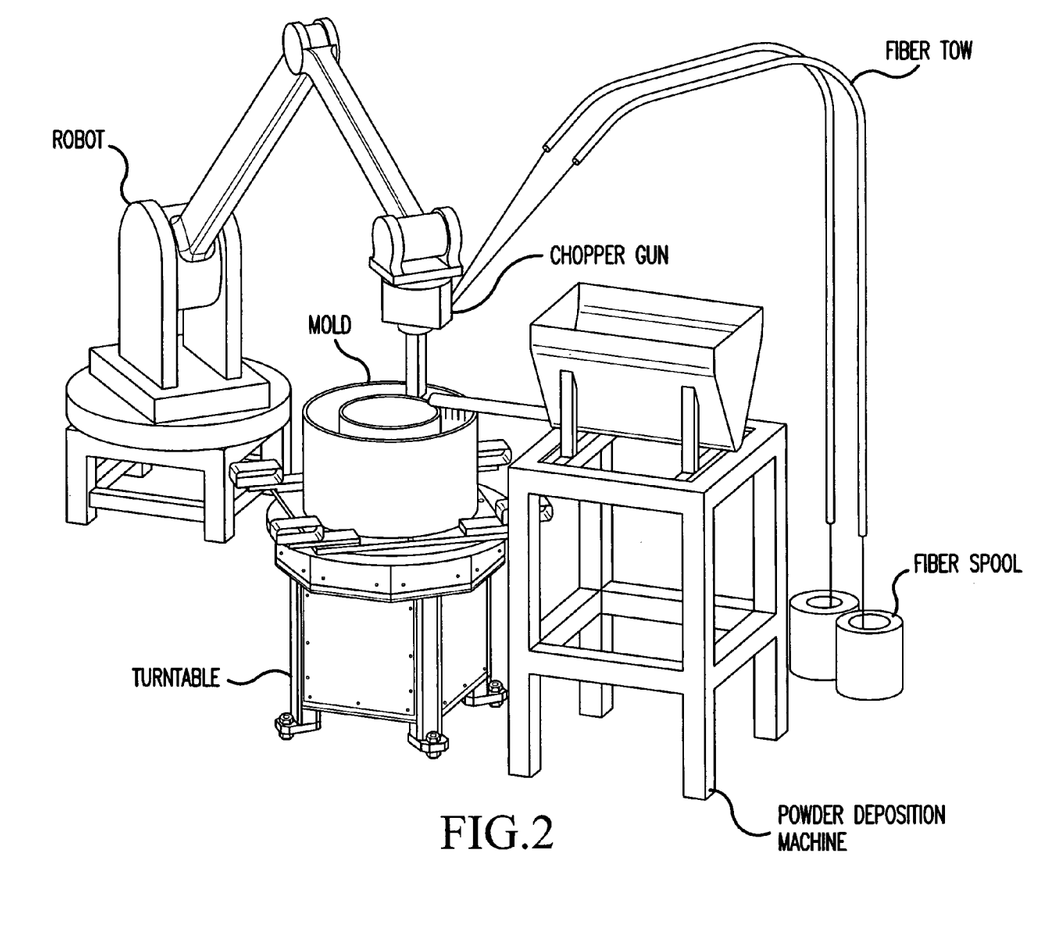
FIG. 2 schematically depicts a robotic fiber chopping and spraying system that may used in accordance with the present invention.

FIBER TOW CUTTING. A system for cutting continuous fiber tows into discontinuous fiber tows (chopped fibers) is placed above the bottom of the mold at a convenient distance. This system (the fiber spray system) comprises a fully automated process for chopping continuous fiber tows. A robotic fiber chopping and spraying system that may used in accordance with the present invention is depicted in FIG. 2. The system provides control over fiber length and fiber output rate. Furthermore, tows of different types of fibers can be used simultaneously. Thus, combinations of pitch and PAN based fibers are possible in a single preform. A computer controls the fiber tow output, including the mass rate of the fiber deposition, the length of the tow segments, and the fiber type. The cutting of the continuous fiber tow is accomplished within the chopper head with rotation knives. The chopper head is mounted on a robot. The robot is used to continuously adjust the position of the chopper with reference to the mold.

Figure 3:
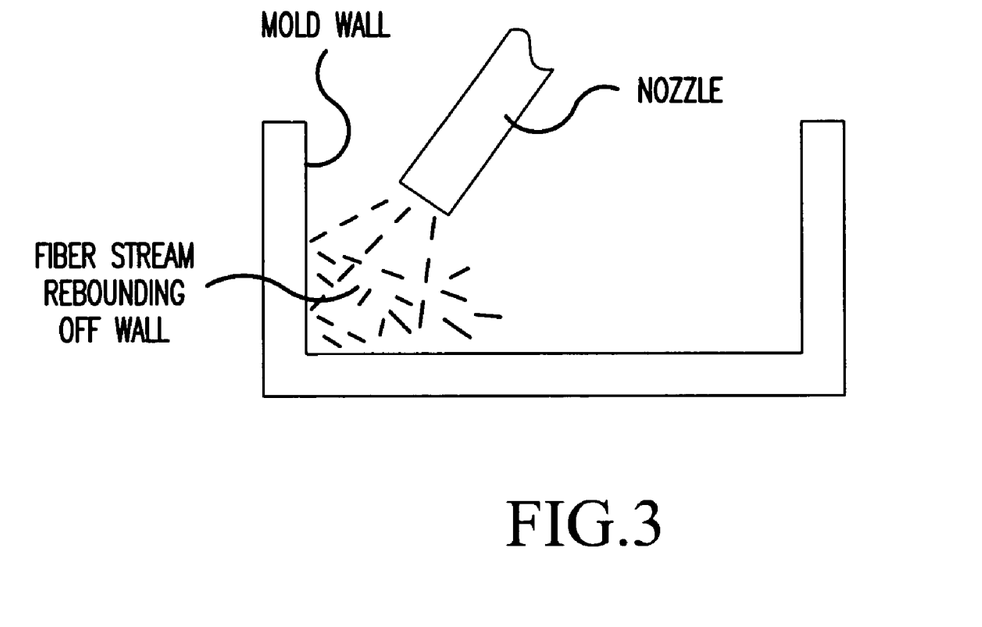
FIG. 3 is a cut away side view of a mold, illustrating the manner in which fibers in fiber streams sprayed into the mold rebound off the walls of the mold to become randomly oriented within the mold.

FIBER DISTRIBUTION. After leaving the cutting stage, fiber tow segments are fed into a nozzle. Such factors as the length, the cross-section, the sizing, and the orientation of the nozzle relative to the motion of the fiber tow streams determine the randomness of the distribution of the tow segment output. The nozzle can be a tube of square cross-section and permits the deposition of nominally randomly oriented fiber tow segments. If the fiber spray is directed onto a surface with a perpendicular component relative to the axis of the nozzle tube, the spray pattern creates a nominal random orientation distribution of fiber tow segments, due to fiber segments rebounding from the perpendicular surfaces. This is depicted in FIG. 3. The robot generally will provide at least two linear displacements and one rotational degree of freedom to allow for a uniform coverage of the deposition plane with fiber tow segments. The in-plane degree of freedom is used to position the nozzle at predefined locations between the inner and the outer wall of the mold.

Figure 4A:
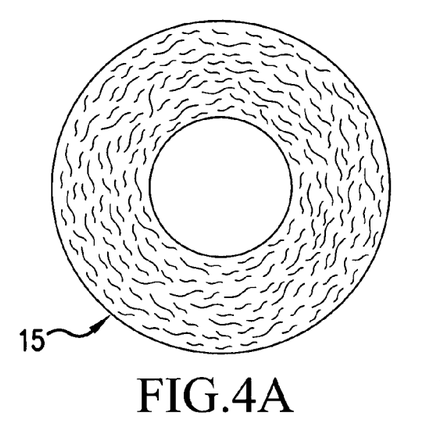
FIGS. 4A, 4B, and 4C each illustrate fibers deposited in a mold in preform manufacture in accordance with this invention.
Figure 4B:
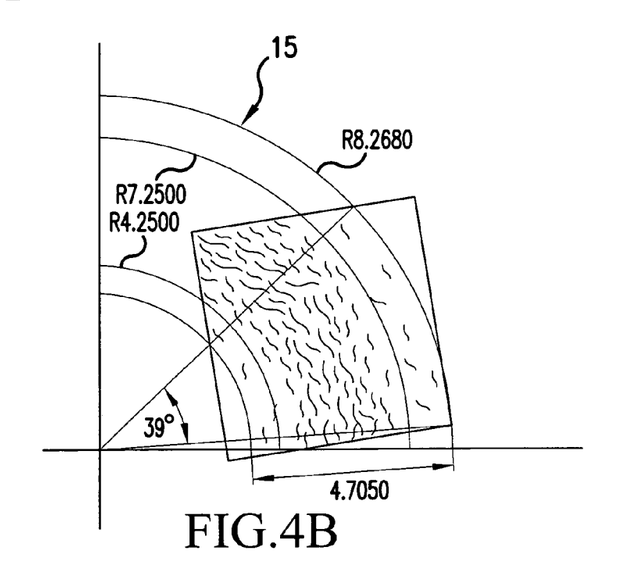

Generally, several concentric iterations of fiber tow deposition are necessary to cover the area between the inner and the outer walls with a uniform mass per unit area of fiber tow segments, as illustrated in FIGS. 1A–1C. In FIG. 1A, layers of short fibers (11) are deposited at the bottom of mold (5). In FIG. 1B, the bottom layers of short fibers have been covered by layers of long fibers (19) in the central area of the mold. Finally, FIG. 1C shows the layers of long fibers in the central area of the mold covered by layers of short fibers (11) at the top of the mold. Once a stream of fiber tow segments has been deposited along the required number of concentric rings, the robot returns the nozzle to its initial radial position. The rotational degree of freedom of the robot is used to tilt the axis of the nozzle, and to feed the fiber tow segments into the mold via a stream directed towards the walls. This tilted stream can be used to produce a uniform mass coverage close to the walls of the mold. FIG. 4A is a top plan schematic view of a preform mold partially filled with fibers. FIG. 4B is a partial photographic depiction of such a preform mold partially filled with fibers.

Figure 4C:
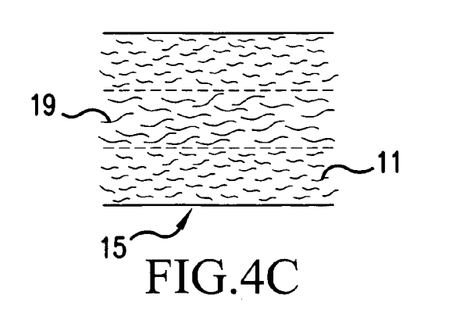

FUNCTIONAL GRADING. Since during the deposition of each layer of fiber tow segments, newly deposited fiber tow segments interact with those previously deposited, good intermingling is obtained and the formation of a structure having layered characteristics is avoided. The robot position between inner and outer wall, as well as its vertical position, is coordinated with the mass rate, tow segment length, and fiber type produced by the chopping device. By changing these variables depending on the vertical and/or radial position of the nozzle, respectively, a preform microstructure with controlled variation in properties can be obtained. Preforms can thus be made which possess gradients in the through-thickness in terms of fiber length, fiber type, and reinforcement volume fraction. Through-thickness gradients are illustrated in FIG. 1C and FIG. 4C. FIG. 4C shows a cross-section of a brake disc preform (15), having longer reinforcement fibers (19) in the inner layers of the disc and shorter reinforcement fibers (11) in the top and bottom surface layers of the disc.

BINDER. Simultaneously with the fiber tows, a dry powder or mixture of powders is dispensed from a powder deposition system. The powder deposition system consists of a feed and an auger feed system. The auger is embedded in a vibrating tube, and is positioned above the rotating mold in the radial direction. The auger tube possesses outlets that are adjusted in size such that a constant mass per area is deposited between the inner and the outer wall of the mold. The powder deposited by this system may be, for instance, a phenolic binder resin.

Anti-oxidants can also be added in desired areas of the preform, for instance lug regions, during the preforming process by means of the powder deposition system. Boron, $SiO_2$, and SiC particulates are typical of the anti-oxidants which can be used.

Figure 5:
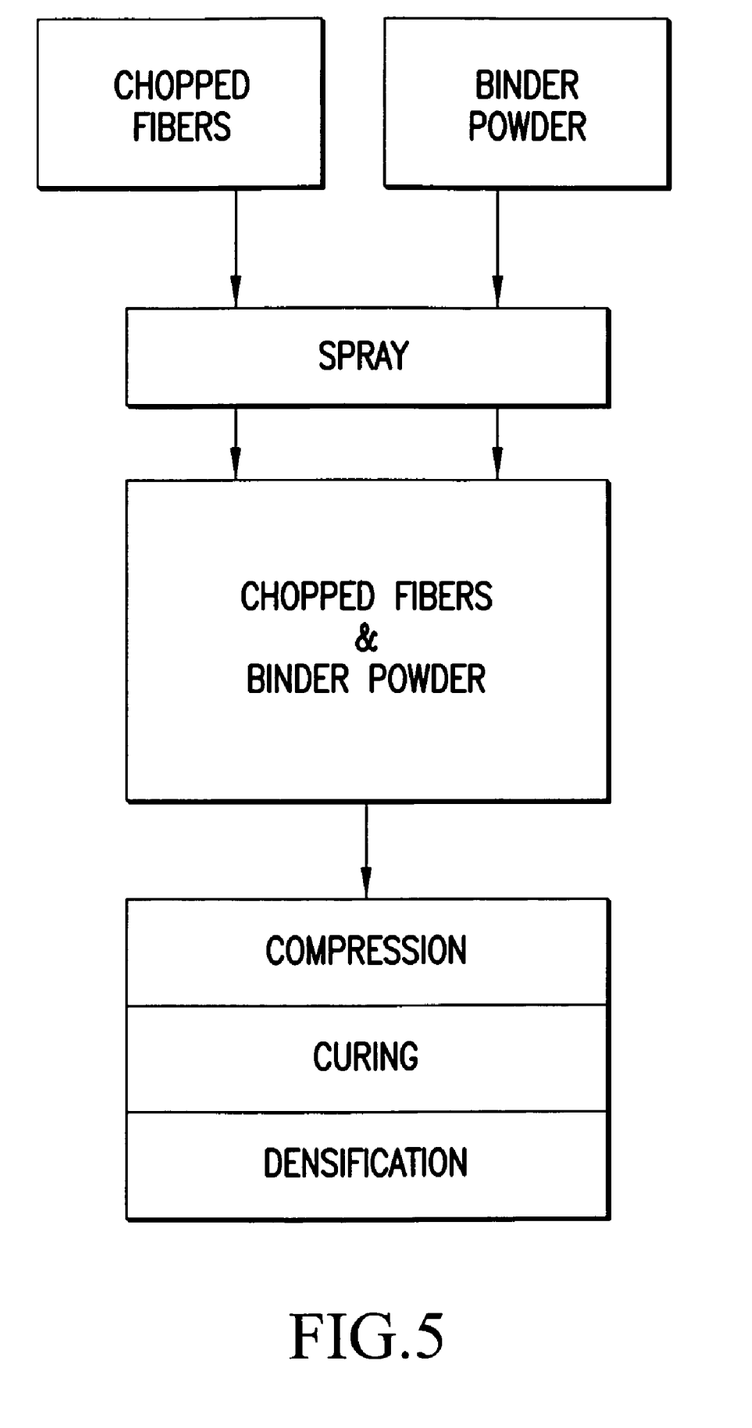
FIG. 5 is a block diagram illustrating the overall process of this invention.

PREFORM FORMATION. FIG. 5 is a block diagram illustrating the overall process of this invention. Once the desired amount of material has been deposited into the rotating mold, a heavy ring-shaped lid is pressed slowly into the mold to compress the fibrous matrix. This lid contains a series of holes that allow air to escape during the placement of the lid onto the fiber body.

The mold containing the still fibrous preform is subsequently moved to a furnace and heated. The binder resin is softened under temperatures that do not advance (crosslink) the resin. The heated preform is then moved to a press and consolidated within the ring-shaped mold. Thereby, the softened binder resin and the fibers, along with any additives such as anti-oxidant particulates, are pressed to form a consolidated preform for the final composite part. The first portion of the cycle forms the preform part under high pressure (e.g., about 170 tons), with the pressure being dependent upon the area of the part. This first portion of the cycle also includes a breathing cycle to eliminate volatile chemical compounds that could cause defects. After finishing the press cycle and subsequent cooling, the consolidated preform is removed from the mold.

In a second compaction stage the preform is placed into a mold to form the final product under high pressure and temperatures (normally exothermic temperatures). Over the remaining portion of the cycle, the resin undergoes cure. However, the resin never reaches total cure in the press. The preform is then placed in an oven to go through a slow ramp cycle (up to about 250° C.). Once this temperature is reached and held, the resin is completely cured and then the preform moves to the carbonization furnace to convert to carbon.

DENSIFICATION. Resin Transfer Molding ("RTM") can play an important role in the densification of the preform. In accordance with this invention, the RTM process may use liquid synthesized mesophase pitches with high carbon yield (higher than 80%). The pitch may be melted in a single screw extruder, and stored under pressure, in a hydraulic accumulator. The accumulator allows precise control of injection volume, pressure, and pitch transfer rate. The part to be injected is preheated and placed into a form-fitting cavity in a mold attached to the extruder and accumulator. The mold is also preheated. Once the part is clamped into the mold, pitch is injected into the part. Subsequently the pitch impregnated preform is cooled to form a solid pitch matrix. In subsequent steps oxidation stabilization if performed to thermoset the pitch by cross-linking. The stabilized pitch is then charred (carbonized). Finally, the part is subjected to further heat treatment cycles and final densification by chemical vapor deposition.

CHEMICAL VAPOR DEPOSITION. Chemical Vapor Deposition and Chemical Vapor Infiltration processes are well known to those skilled in the art. The carbonized preform is placed within an evacuated heated chamber, and a carbon-containing gas, e.g., methane, is introduced into the chamber. Carbon atoms from the cracked gas settle or infiltrate into the pore spaces in the specimen, filling in free volume between the fibers filaments or the pore space in the stabilized pitch, thereby increasing the density of the part.

FINAL PROCESSING. Preforms configured as brake parts generally are ring-shaped. They can be machined to possess cut-outs, or "lugs", at either the inner or outer perimeter to enable load transfer. Such final processing is conventional and techniques for carrying out such operations are within the expected skill of those skilled in the art to which this invention pertains.

One preferred embodiment of this invention is an annular brake disc preform, having reinforcement fibers of at least two different lengths distributed throughout the body of the preform, with the reinforcement fibers located near the exterior planes of the disc being predominately the shorter fibers and with the reinforcement fibers located in the central planes of the disc being predominately the longer fibers, as illustrated in FIGS. 1C and 4C.

EXAMPLES

Example 1

An annular mold is provided having an outer diameter of 42 cm, an inner diameter of 18.1 cm, and a depth of 5.08 cm. PAN fiber having a density of 1.78 was fed into an automatic chopper and the chopped fiber was fed into a robotically controlled spray nozzle. The fiber was initially cut to 13 mm lengths. The spray nozzle distributed a first layer of 75 grams of chopped fiber concentrically on the bottom of the annular mold. The spray nozzle then distributed, one after the other, thirteen more lots of 13 mm fiber around the inside of the mold. Then the chopper cut fibers to 20 mm lengths, and the spray nozzle distributed a 75 gram layer of the 20 mm fiber on top of the 13 mm fibers inside the mold. Fiber lengths were increased stepwise until, in the twentieth layer, 51 mm long fiber segments were being laid down. After seven 51 mm fibers lots were distributed around the inside of the mold, fiber lengths were reduced stepwise, until the thirty-second layer was back down to 13 mm fibers. A total of forty-six "layers" or iterations was carried out. Of course, due to mechanical interactions of the fibers being sprayed with fibers already present in the mold, the layers blended into each other and did not remain discrete or subject to delamination, as would have been the case with a preform made up of fabric layers. Table 1 provides details on each of the fiber laydown cycles.

TABLE 1

| Cycle | (mm) | (g) |
|---|---|---|
| 1 | 13 | 75 |
| 2 | 13 | 75 |
| 3 | 13 | 70 |
| 4 | 13 | 75 |
| 5 | 13 | 70 |

TABLE 1-continued

| Cycle | (mm) | (g) |
|---|---|---|
| 6 | 13 | 75 |
| 7 | 13 | 70 |
| 8 | 13 | 75 |
| 9 | 13 | 75 |
| 10 | 13 | 75 |
| 11 | 13 | 75 |
| 12 | 13 | 70 |
| 13 | 13 | 75 |
| 14 | 13 | 70 |
| 15 | 20 | 75 |
| 16 | 26 | 75 |
| 17 | 32 | 70 |
| 18 | 38 | 75 |
| 19 | 44 | 70 |
| 20 | 51 | 75 |
| 21 | 51 | 75 |
| 22 | 51 | 75 |
| 23 | 51 | 70 |
| 24 | 51 | 75 |
| 25 | 51 | 75 |
| 26 | 51 | 70 |
| 27 | 44 | 75 |
| 28 | 38 | 70 |
| 28 | 32 | 75 |
| 30 | 26 | 80 |
| 31 | 20 | 80 |
| 32 | 13 | 75 |
| 33 | 13 | 75 |
| 34 | 13 | 75 |
| 35 | 13 | 80 |
| 36 | 13 | 80 |
| 37 | 13 | 70 |
| 38 | 13 | 70 |
| 39 | 13 | 70 |
| 40 | 13 | 75 |
| 41 | 13 | 70 |
| 42 | 13 | 70 |
| 43 | 13 | 75 |
| 44 | 13 | 70 |
| 45 | 13 | 70 |
| 46 | 13 | 75 |

Subsequently, the fiber/binder matrix was heated and compressed to form the C—C brake preform. The preform is then moved to the next operation, second stage compaction (or cure press), where the preform is consolidated to final shape and density. The resin is staged and moves to the post cure oven to crosslink the phenolic binder.

Example 2

An annular mold is provided having an outer diameter of 42 cm, an inner diameter of 18.1 cm, and a depth of 5.08 cm. PAN fiber having a density of 1.78 was fed into an automatic chopper and the chopped fiber was fed into a robotically controlled spray nozzle. The fiber was initially cut to 13 mm lengths. The spray nozzle distributed a first layer of 55 grams of chopped fiber concentrically on the bottom of the annular mold. The spray nozzle then distributed, one after the other, twenty-one more lots of 13 mm fiber around the inside of the mold. Then the chopper cut fibers to 18 mm lengths, and the spray nozzle distributed a 55 gram layer of the 18 mm fiber on top of the 13 mm fibers inside the mold. Fiber lengths were increased stepwise until, in the thirtieth layer, 51 mm long fiber segments were being laid down. After ten 51 mm fibers lots were distributed around the inside of the mold, fiber lengths were reduced stepwise, until the forty-seventh layer was back down to 13 mm fibers. A total of sixty-nine iterations was carried out. Table 2 provides details on each of the fiber laydown cycles.

TABLE 2

| Cycle | (mm) | (g) |
|---|---|---|
| 1 | 13 | 75 |
| 2 | 13 | 75 |
| 3 | 13 | 70 |
| 4 | 13 | 75 |
| 5 | 13 | 70 |
| 6 | 13 | 75 |
| 7 | 13 | 70 |
| 8 | 13 | 75 |
| 9 | 13 | 75 |
| 10 | 13 | 75 |
| 11 | 13 | 75 |
| 12 | 13 | 70 |
| 13 | 13 | 75 |
| 14 | 13 | 70 |
| 15 | 13 | 75 |
| 16 | 13 | 75 |
| 17 | 13 | |
| 18 | 13 | |
| 19 | 13 | |
| 20 | 13 | |
| 21 | 13 | |
| 22 | 13 | |
| 23 | 18 | |
| 24 | 23 | 70 |
| 25 | 27 | 75 |
| 26 | 32 | 70 |
| 27 | 37 | 75 |
| 28 | 42 | 75 |
| 29 | 46 | 75 |
| 30 | 51 | 70 |
| 31 | 51 | 75 |
| 32 | 51 | 75 |
| 33 | 51 | 70 |
| 34 | 51 | 75 |
| 35 | 51 | 70 |
| 36 | 51 | 75 |
| 37 | 51 | 80 |
| 38 | 51 | 80 |
| 39 | 51 | 75 |
| 40 | 46 | |
| 41 | 42 | |
| 42 | 37 | |
| 43 | 32 | |
| 44 | 27 | |
| 45 | 23 | |
| 46 | 18 | |
| 47 | 13 | 75 |
| 48 | 13 | 75 |
| 49 | 13 | 80 |
| 50 | 13 | 80 |
| 51 | 13 | 70 |
| 52 | 13 | 70 |
| 53 | 13 | 70 |
| 54 | 13 | 75 |
| 55 | 13 | 70 |
| 56 | 13 | 70 |
| 57 | 13 | 75 |
| 58 | 13 | 70 |
| 59 | 13 | 70 |
| 60 | 13 | 75 |
| 61 | 13 | |
| 62 | 13 | |
| 63 | 13 | |
| 64 | 13 | |
| 65 | 13 | |
| 66 | 13 | |
| 67 | 13 | |
| 68 | 13 | |
| 69 | 13 | |

Subsequently, the fiber/binder matrix was heated and compressed to form the C—C brake preform. The preform is then moved to the next operation, second stage compaction (or cure press), where the preform is consolidated to final shape and density. The resin is staged and moves to the post cure oven to crosslink the phenolic binder.

INDUSTRIAL APPLICABILITY

The controlled variations in preform microstructure described above can be used to optimize the functional characteristics of the final product, including wear, strength, toughness, thermal conductivity, thermal residual stresses, and thermal characteristics. The gradual variation in properties through the thickness of the preform is of special importance. Locating longer fibers in the interior planes of a brake disc preform contribute to enhanced overall strength of the brake disc, while locating shorter fibers in the outer layers of the preform enhance the friction and wear properties of the brake disc. By designing a material without discontinuities in the property distribution, the presence of internal stress concentrations due to material property changes is avoided.

What is claimed is:

1. A process of making a carbon-carbon composite part, which process comprises the steps of:
   (a) providing chopped fibers selected from the group consisting of pitch fibers and poly(acrylonitrile) fibers;
   (b) directing a robotic spraying apparatus to spray said chopped fibers into an annular mold to provide a bed of fibers in said mold;
   (c) depositing a curable binder in said mold so that said binder is intermixed with said fiber bed;
   (d) compressing said fiber bed and curable binder within said mold;
   (e) curing said binder to form a preform;
   (f) filling said preform with pitch; and
   (g) subjecting the pitch to chemical vapor deposition to form a carbon-carbon composite part.

2. A process of making a carbon-carbon composite part, which process comprises the steps of:
   (a) providing chopped fibers of at least two different lengths selected from the group consisting of pitch fibers and poly(acrylonitrile) fibers;
   (b) directing a robotic spraying apparatus to spray said chopped fibers into an annular mold to provide a bed of fibers in said mold, wherein said fiber bed is provided by multiple concentric iterations of chopped fiber deposition in a first, bottom plane between an inner and an outer wall of said mold followed by multiple concentric iterations of chopped fiber deposition in a second, higher plane between the inner and outer wall of the mold;
   (c) depositing a curable binder in said mold so that said binder is intermixed with said fiber bed;
   (d) compressing said fiber bed and curable binder within said mold;
   (e) curing said binder to form a preform;
   (f) filling said preform with pitch; and
   (g) subjecting the pitch to chemical vapor deposition to form a carbon-carbon composite part.

3. The process of claim 2, wherein said preform is configured as a brake disc and wherein shorter fibers are deposited in the top areas of said brake disc preform, longer fibers are deposited in the central areas of said brake disc preform, and shorter fibers are deposited in the top areas of said brake disc preform.

4. The process of claim 3, wherein said shorter fibers range in length from 10–20 mm and wherein said longer fibers range in length from 40–60 mm.

5. The process of claim 4, wherein layers of fibers having lengths ranging from 15–50 mm are deposited in the areas between the central areas and the top and bottom areas of said brake disc preform.

6. The process of claim 1, wherein the spraying step is repeated 40 to 80 times in order to provide said fiber bed in said mold.

7. The process of claim 1, wherein binder deposition is conducted simultaneously with fiber spraying.

8. The process of claim 1, wherein the step of depositing a curable binder in said mold also deposits a particulate antioxidant in said mold.

9. The process of claim 8, wherein said curable binder is a phenolic resin powder and said particulate antioxidant is silicon carbide.

10. An annular brake disc preform, wherein reinforcement fibers of at least two different lengths are distributed throughout the body of the preform, with the reinforcement fibers located near the exterior planes of the disc being predominately the shorter fibers and with the reinforcement fibers located in the central planes of the disc being predominately the longer fibers.

11. The annular brake disc preform of claim 10, wherein said shorter fibers range in length from 10–20 mm and wherein said longer fibers range in length from 40–60 mm.

12. The annular brake disc preform of claim 11, wherein 40 to 80 layers of fibers having lengths ranging from 10–60 mm are deposited within said brake disc preform in a planar gradient in which the fiber lengths are increased from the bottom of the disc to the middle thereof and then are decreased to the top of the disc.

13. A method of improving the balance of friction, wear, and strength properties in a carbon-carbon composite brake disc of a given weight, which method comprises manufacturing said carbon-carbon composite brake disc from a preform having 40 to 80 layers of fibers ranging in length from 10–60 mm deposited within said brake disc preform in a planar gradient in which the fiber lengths are increased from the bottom of the disc to the middle thereof and then are decreased to the top of the disc.

* * * * *